United States Patent [19]

van der Lely

[11] 4,214,635
[45] Jul. 29, 1980

[54] IMPLEMENT

[76] Inventor: Cornelis van der Lely, 7, Brüschenrain, Zug, Switzerland

[21] Appl. No.: 905,438

[22] Filed: May 12, 1978

[51] Int. Cl.² ............................................. A01B 61/04
[52] U.S. Cl. .................... 172/271; 64/28 R; 172/103
[58] Field of Search ............... 172/271, 269, 265, 270, 172/264, 103; 64/28 R

[56] References Cited

U.S. PATENT DOCUMENTS

| | | | |
|---|---|---|---|
| 1,410,717 | 3/1922 | Pestel | 64/28 R |
| 1,635,442 | 7/1927 | Sigurd | 172/271 |
| 1,778,477 | 10/1930 | Wood | 64/28 R |
| 2,395,342 | 2/1946 | Morkoski | 172/271 X |
| 2,913,060 | 11/1959 | Owen | 172/271 X |
| 3,049,898 | 8/1962 | Voth | 64/28 R |
| 3,762,655 | 10/1973 | Brewer | 64/28 R |

FOREIGN PATENT DOCUMENTS

| | | | |
|---|---|---|---|
| 1087393 | 8/1960 | Fed. Rep. of Germany | 172/271 |
| 1090975 | 10/1960 | Fed. Rep. of Germany | 64/28 |
| 1402882 | 5/1965 | France | 172/271 |
| 86925 | 3/1966 | France | 172/271 |
| 7409104 | 1/1976 | Netherlands | 172/59 |

*Primary Examiner*—Richard J. Johnson
*Attorney, Agent, or Firm*—Mason, Mason and Albright

[57] ABSTRACT

An implement mounts a plurality of working members through couplings, each coupling having a first member that can turn relative to a second member, upon overload. A shear pin normally prevents relative turning between the two members until overload and the pin is mounted on a holder that is releaseably connected to the coupling. The pin is in severable portions, one portion being sheared upon each overload and the remainder of the pin being automatically advanced to re-establish operative connection between the members when the latter are again in operative alignment.

16 Claims, 11 Drawing Figures

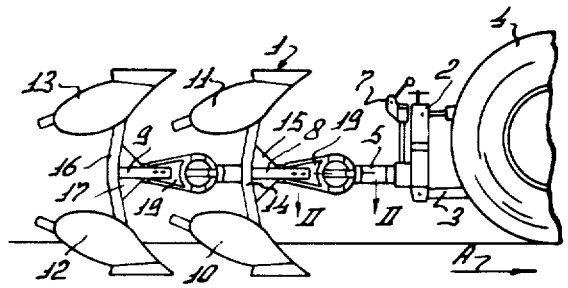
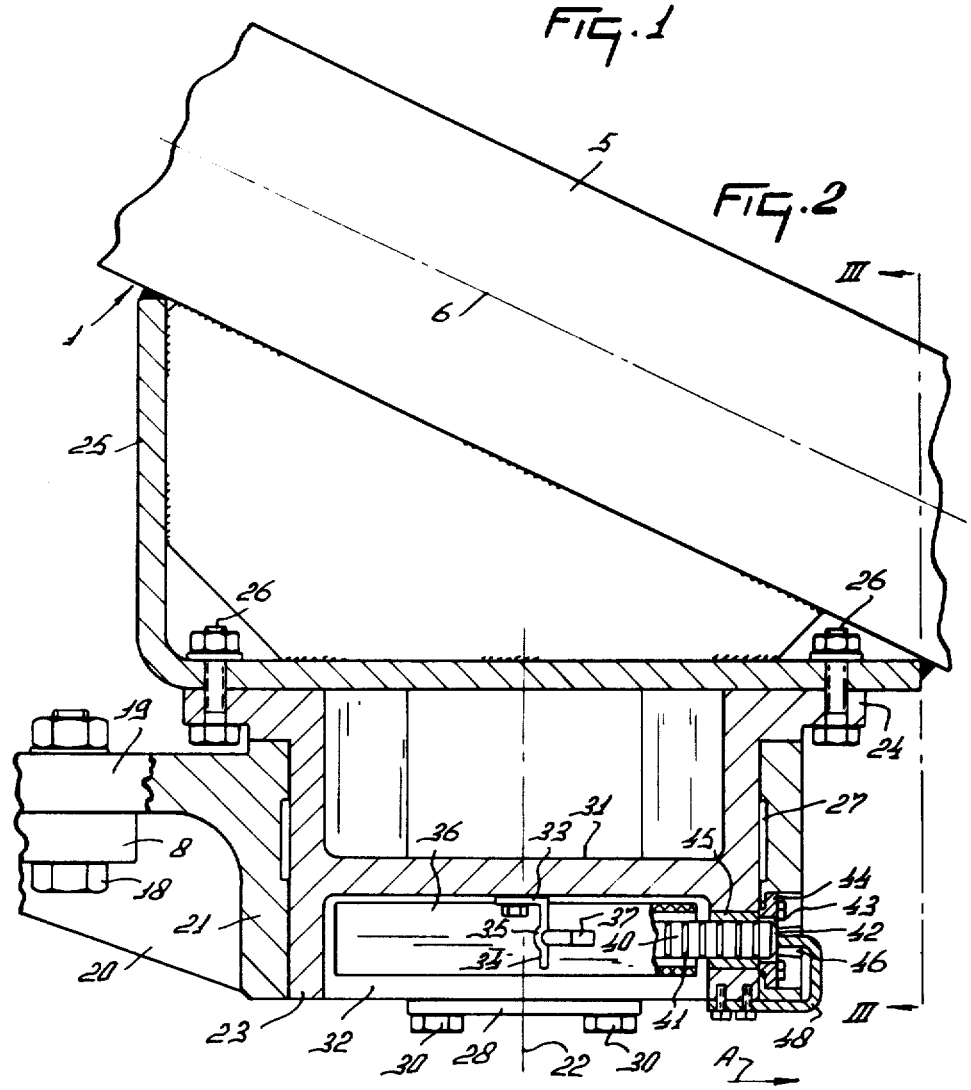

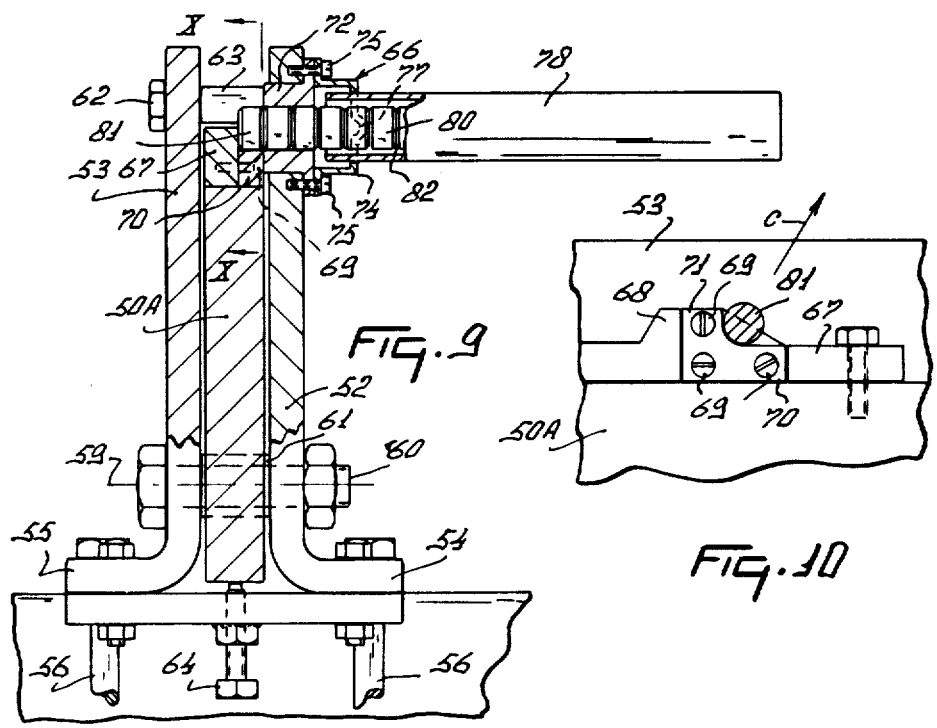
FIG. 9
FIG. 10
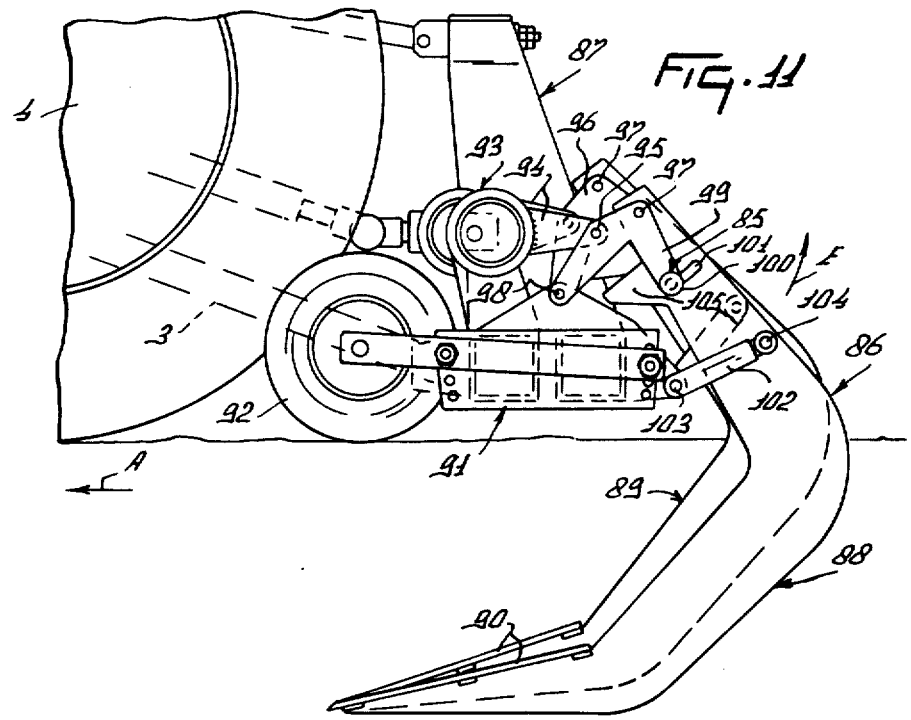
FIG. 11

IMPLEMENT

According to a first aspect of the present invention there is provided an implement comprising a frame to which a working member is rigidly connected through two coaxial circular coupling members that are interconnected, by a shear pin, fracture of the shear pin permitting relative pivotal movement between the coupling members and the working member and the frame, advancement means being provided for moving the shear pin, after fracture, to re-establish rigid connection between the two coupling members.

According to a second aspect of the present invention there is provided an implement comprising a frame to which a working member is rigidly connected during normal operation by a shear pin of a shear pin coupling comprising a first coupling member and a second coupling member, the first coupling member being disposed coaxially within the second coupling member, and the shear pin being disposed substantially wholly within a space bounded by the interface between the two coupling members, advancement means being provided for moving the shear pin, after fracture, to re-establish rigid connection between the working member and the frame.

For a better understanding of the present invention and to shown how it may be carried into effect, reference will now be made, by way of example only, to the accompanying drawings, in which:

FIG. 1 is a side elevation of an agricultural implement attached to a tractor;

FIG. 2 is an enlarged partly sectional plane view taken on the line II—II in FIG. 1;

FIG. 9 is a partly sectional view taken on the line IX—IX in FIG. 7;

FIG. 10 is a partly sectional view taken on the line X—X in FIG. 9; and

FIG. 11 is a side elevation of a third embodiment of an agricultural implement attached to a tractor.

Figure 3:
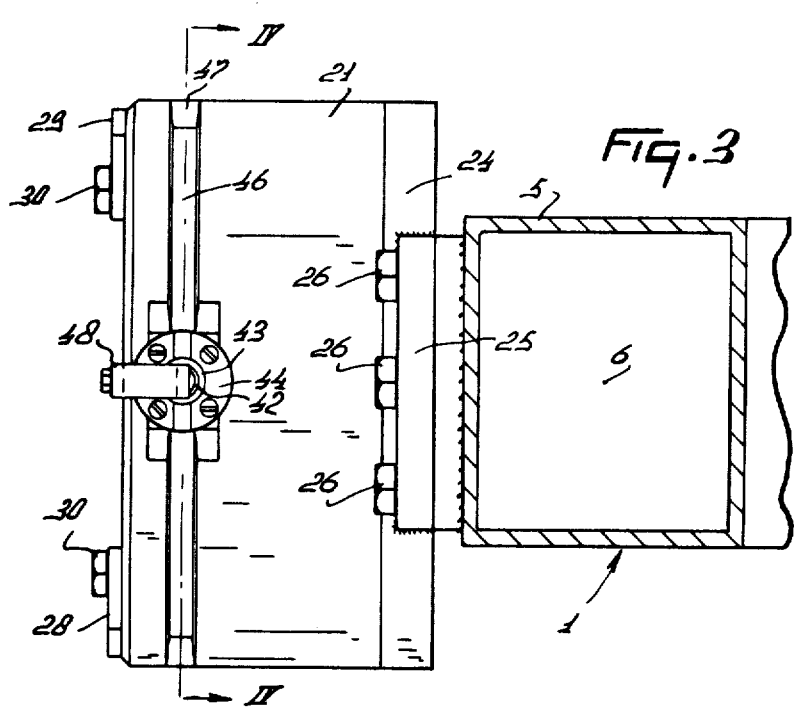
FIG. 3 is a sectional view taken on the line III—III in FIG. 2.

The agricultural implement shown in FIG. 1 is a reversible plough 1. The reversible plough 1 is hitched by a three-point trestle 2 to the three-point lifting device 3 of a tractor 4. The reversible plough 1 comprises a plough beam 5 which extends substantially horizontally in operation, as shown in the side elevation of FIG. 1, and is at an angle of about 60° to the intended direction of operative travel, indicated by an arrow A. The plough beam 5 can be turned about a horizontal axis 6 with the aid of a control mechanism 7 arranged on the rear of the three-point hitch 2. By means of the control mechanism 7 the plough beam 5 can be set in either one of two positions offset from each other by about 180°. On the side of the plough beam 5 there are two pairs of operative parts formed by plough bodies 10, 11 and 12, 13 respectively, having carriers 8 and 9 respectively. As shown in the side elevation of FIG. 1, the plough bodies 10 and 12 are in the underlying position and the plough bodies 11 and 13 are in overlying position. The carriers 8 and 9 extend rearwardly, and are preferably some distance from the plough beam 5 in a substantially horizontal direction; they are parallel to the direction A. Since the plough beam 5 is inclined to the direction A, the plough bodies are fastened by the carriers 8 and 9 to the plough beam 5 so that the operative plough bodies are relatively off-set in fact, but co-operate with one another during operation. The plough bodies 10 and 11 located one above the other are interconnected by a tie element 14, which is connected with the carrier 8, this connection being reinforced by tie plates 15. The same applies to the plough bodies 12 and 13, which are connected with the carrier 9 by means of a tie element 16 and tie plates 17.

The carrier 8 is connected at the front by bolts 18 with arm 19 which extends forwardly for some distance. The arm 19 has upper and lower flanges 20, and arm 19 and the flanges 20 terminating near the plough beam 5 in a hub 21 having a substantially cylindrically inner opening centered on a pivotal axis 22 which is substantially horizontal and substantially perpendicular to the direction A. Coaxially within the hub 21 is disposed a cylindrical stub shaft 23 which has, on the end near the plough beam 5, an outwardly directed flange 24, by which the stub shaft 23 is fastened by bolts 26 to a support 25. The smallest diameter of the stub shaft 23 preferably exceeds the largest cross-sectional area of the carrier 8 and 9 respectively. The support 25 comprises, as shown in the sectional view of FIG. 2, an angle member having two limbs which are substantially perpendicular to one another and are connected with the plough beam 5. One limb extends in the direction A, and the other is perpendicular to it. Between the outer wall of the stub shaft 23, which constitutes a first coupling member, and the inner wall of the hub 21, which constitutes a second coupling member, there is an annular opening 27 filled with lubricant for reducing friction between the contacting surfaces of the hub 21 and the stub shaft 23. In a direction parallel to the axis 22, the hub 21 is locked axially with respect to the plough beam 5 and the stub shaft 23 by retaining plates 28 and 29 which are arranged on the lower and upper sides respectively of the stub shaft 23 and are secured by bolts 30 at widened parts of the hollow stub shaft 23.

Figure 4:
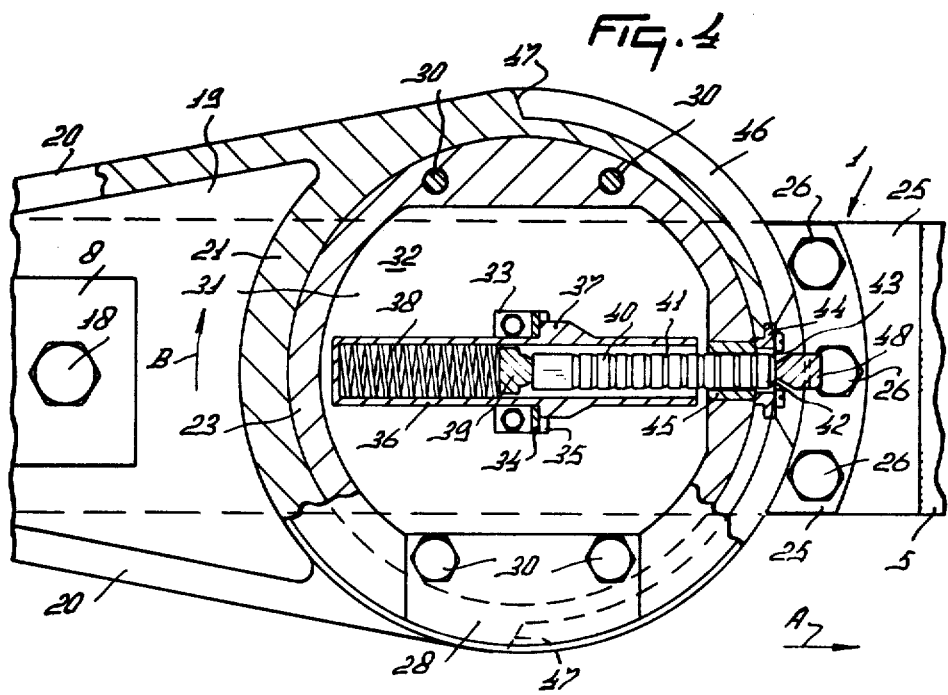
FIG. 4 is a partly sectional view taken on the line IV—IV in FIG. 3.

The hollow space inside the stub shaft 23 is divided by a transverse partition 32 into two spaces, this partition being located about two thirds of the way along the stub shaft from the support 25, measured in a direction parallel to the axis 22. The face of the partition 31 away from the support 25 constitutes the inner boundary of an outwardly opening space 32. The space 32 accommodates a supporting plate 33, which has two outwardly extending tags 34, which have, substantially midway along their length, a slightly recessed part 35. By means of the tags 34, a shear pin holder 36 is secured in the space 32. The shear pin holder 36 has a cylindrical inner surface and has on its outer surface two lugs 37 which co-operate with the recessed parts 35 of the tags 34 to secure the holder 36 in place. Together with the lugs 37, the tags 34 and the parts 35 provide a quick-action locking means or bayonet connection for the holder 36. In the holder 36 there is a compression spring 38 which engages at one end the closed end of the holder 36 and at the other end a pressure pin 39. Acting through the pressure pin 39, the spring 38 presses a shear pin 40 towards the wall of the hub 21. The centerline of the shear pin 40 intersects the pivotal axis 22 and extends, in normal operation, parallel to the longitudinal axis of the carrier 8 or 9 respectively. The movement of the shear pin 40 inside the space 32 is limited by the boundary face between the two coupling members 21 and 23. The shear pin has in its unused state a length of preferably more than 10 cms. The shear pin is locally weakened by equispaced grooves 41. The shear pin shown in FIG. 4 has portions 42 which can break off successively more than 10 times, preferably 11 times, in the event of overload. In normal operation the endmost portion 42 is located in an opening 43 in the hub 21. The opening 43 is bounded by a hardened sleeve 44, which is connected with the hub 21. The shear pin 40 is guided through the stub shaft 23 in a close fitting hardened steel sleeve 45 which is arranged in a region of the wall of the stub shaft 23, which wall portion is preferably reinforced. The hub 21 has, as shown in the elevational view of FIG. 3, a slightly smaller diameter on either side along arcs of about 90° so that a groove 46 is formed. The groove 46 is bounded on the side of the arm 19 by end faces 47. The stub shaft 23 is connected on the side away from the plough beam 5 with a pin stop member 48 which limits the movement of the pin 40 and has, preferably, a substantially U-shaped form with two limbs, one of which is connected to the stub shaft 23 and the other of which engages the endmost shear pin portion 42. The end of the pin stop member 48 is preferably pointed. This end part is otherwise located in the opening 43.

In an analogous manner the carrier 9 is connected by means of shear pin coupling with the plough beam 5.

The construction described above operates as follows.

During operation the reversible plough 1 is pulled along by the tractor 4 in the direction of the arrow A, and the plough bodies 10 and 12 loosen the earth beneath the ground surface and displace it. In normal operation the carriers 8 and 9 are connected rigidly with the plough beam 5 by means of the shear pin 40 of the shear pin coupling comprising the first coupling member constituted by the stub shaft 23 and the second coupling member constituted by the hub 21. The endmost portion 42 of the shear pin 40 is located in the opening 43 in the sleeve 44. The shear pin is pressed by the compression spring 38 towards the pin stop member 48. Since the spring exerts pressure on the closed end of the shear pin holder 36, this holder is urged away from the pin stop member 48 against the tags 34, and so the lugs 37 engage the recessed parts 35 to give a satisfactory and rapidly operable bayonet connection. This situation of normal operation continues as long as the resistance on the plough does not exceed a predetermined value, which is determined by the choice of the strength of the shear pin 40. If the plough resistance exceeds the chosen value, for example, when the mouldboard is subjected to an excessively high resistance due to a stone in the soil, the respective plough body 10 or 12 tends to turn upwardly in the direction of the arrow B in FIG. 4 about the axis 22. This turn can be performed only after the end portion 42 of the shear pin has broken off when the maximum permissible force is exceeded. Thus the plough body can travel past the object causing this excessive force by rotation of the hub 21 about the stub shaft 23, which rotation is facilitated by the presence of lubricant in the annular opening 27. The groove 46 permits the two coupling members to pivot through an arc of in total about 180°. This pivotal movement of the two coupling members is limited by the co-operation between the stops 47 and the pin stop member 48. Owing to this movability the plough body can rise to the ground surface. During the movement the opening 43 comes out from under the pin stop member 48 so that the broken off shear pin portion 42 can drop out of the opening. Subsequently the tractor driver can raise the entire implement using the lifting device 3 so that, owing to the weight of the plough bodies, the hub 21 will turn about the stub shaft 23 in a direction opposite the arrow B. Under the action of the spring 38 the part remaining of the pin 40 is slipped into the opening 43 so that the shear pin 40 gets into a new connecting position. The same pin 40 can break and re-establish the connection upon overload more than ten times. After the shear pin has been fully consumed, the holder can be simply removed from the space 32 by moving the holder towards the pin stop member 48 and by turning it about its longitudinal axis through about 45° so that the lugs 37 are disengaged from the tags 34. The holder 36 can be filled with a new shear pin 40 and be simply and rapidly put back into the space 42 using the bayonet connection provided by the tags 34 and the lugs 37, so that the operation of the implement can be resumed after a very short time. In view of soiling and risk of damage it is advantageous for the holder to be located, as shown, in the space 32 enclosed by the stub shaft 23; the cylindrical boundary surface between the hub 21 and the stub shaft 23 has a diameter of about 20 cms. With the plough beam 5 turned about the shaft 6 so that the plough bodies 11 and 14 are operative, these plough bodies are protected against overload in an identical manner.

Figure 5:
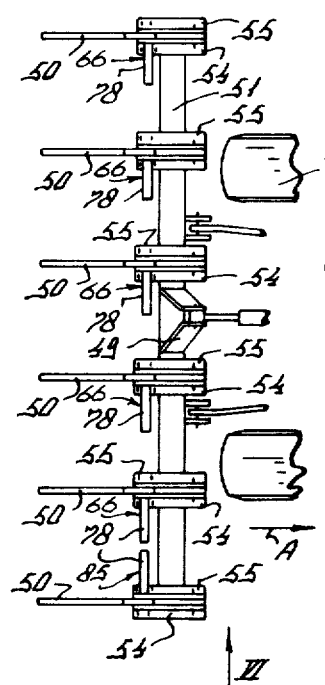
FIG. 5 is a plan view of a second embodiment of an agricultural implement attached to a tractor.
Figure 6:
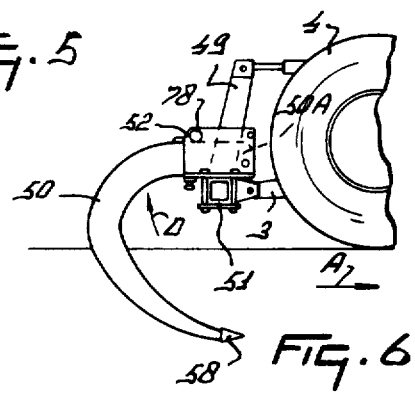
FIG. 6 is a side elevation taken in the direction of the arrow VI in FIG. 5.

In the second embodiment of the agricultural implement shown in FIGS. 5 and 6, the tractor 4 is connected by a three-point lift 3 with an arm 49 constituting the suspension of an agricultural implement comprising a row of operative parts in the form of soil working tines 50. These tines are connected by a transverse beam 51 with the arm 49. Each tine 50 is connected with a transverse beam 51 by means of two upwardly extending, substantially parallel plates 52 and 53, which are secured by means of outwardly directed flanges 54 and 55 on the top of the hollow transverse beam 51.

Figure 7:
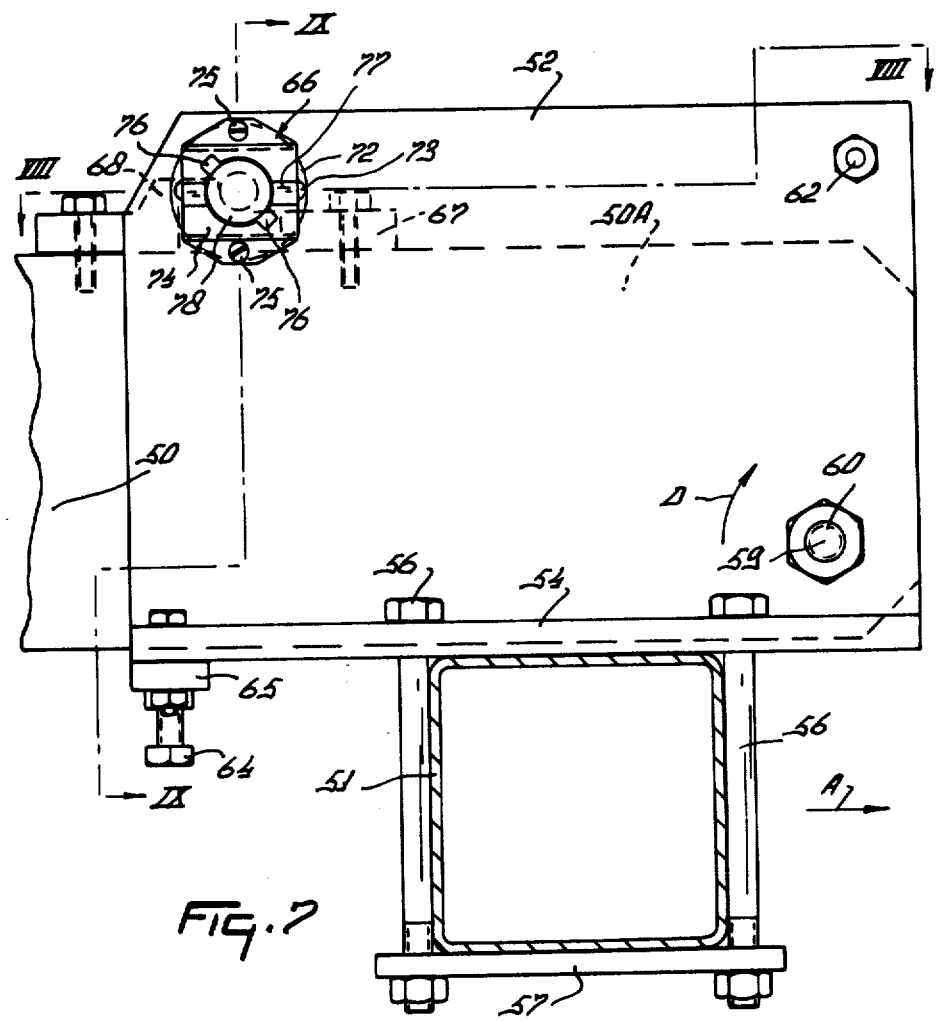
FIG. 7 is an enlarged partly sectional elevational view of part of the agricultural implement of FIG. 6.

As shown in FIG. 7 the flanges 54 and 55 are fastened by means of tensile bolts 56 and a strip 57 to the hollow transverse beam 51.

Figure 8:
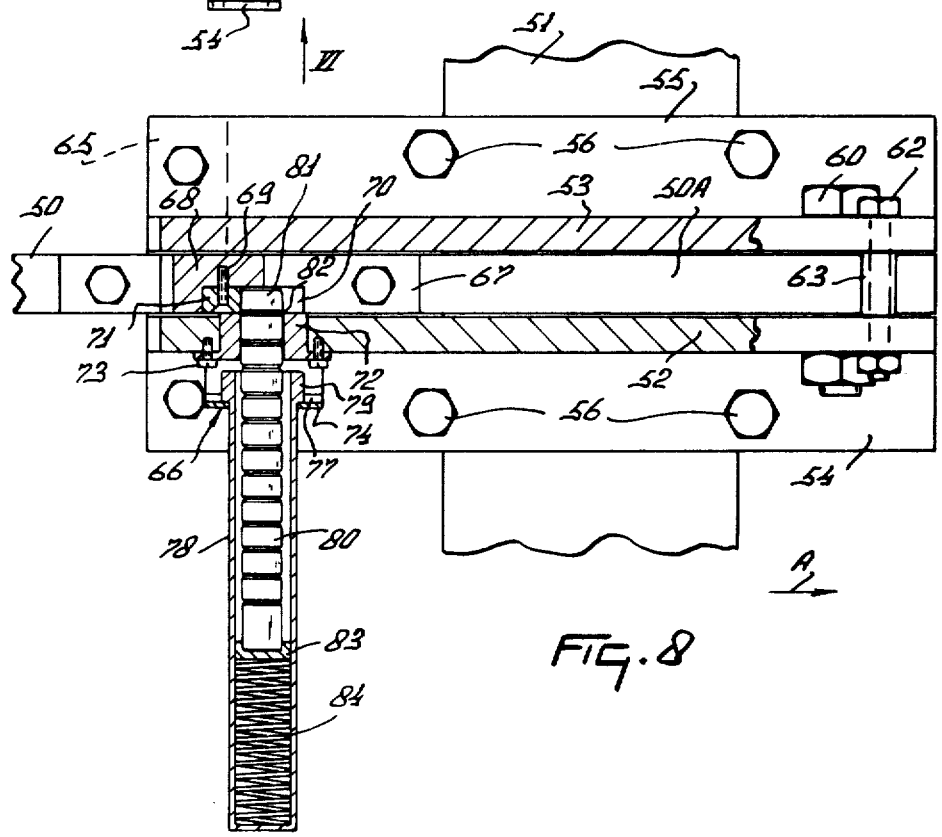
FIG. 8 is a partly sectional view taken on the line VII—VII in FIG. 7.

Each tine 50 is provided at the end away from the beam 51 with a cutting part formed by a tip 58, which is located approximately vertically beneath a pivotal axis 59 of a bolt 60 by which the tine 50 is connected with the plates 52 and 53. Between the plates 52 and 53, the bolt 60 has a spacer sleeve 61. As shown in FIG. 7, the bolt 60 is located near the lower edges of the plates 52 and 53 and in the front of the front side of the beam 51. The plates 52 and 53 are interconnected at a position above the bolt 60 by a bolt 62, and a spacer sleeve 63 is arranged between the plates (FIG. 8). Where it lies between the plates 52 and 53, the tine 50 has a portion 50A, the lower edge of which is substantially horizontal during operation. The plates 52 and 53 provide a lateral support for the portion 50A. The position of the portions 50A can be slightly varied by means of a set bolt 64 arranged midway along a tie strip 65 extending between the plates 52 and 53. The top edge of the portion 50A is some distance beneath the top edges of the plates 52 and 53 (FIG. 7). A shear pin coupling 66 is arranged between a first coupling member constituted by the plate 52 and a second coupling member constituted by the portion 50A. The shear pin coupling 66 is, as shown in the elevational view of FIG. 7, substantially diagonally opposite the bolt 60 and is near the corner between the rear and top edges of the plate 52. By means of the shear pin coupling 66 the tine 50 rigidly connected, in normal operation, with the frame formed by the plates 52 and 53 and the transverse beam 51. To the top edge of the portion 50A is fastened a supporting plate 67 (see FIGS. 8 and 10) which has an upwardly extending support 68 approximately midway along its length, which extends in the intended direction of operative travel A. The support 68 and the adjacent part of the supporting plate 67 have a recess in which a cutting plate 70 is fastened by means of screws 69 having countershunk haeds. The cutting plate 70 is preferably made from hardened material. Adjacent the cutting plate 70 in the portion 50A the plate 52 is provided with a cutting plate or sleeve 72 of hardened material, fastened by screw 73 to the face of the plate 52 away from the tine 50. FIG. 7 shows that at the area of the cutting plate 72 there is a retaining plate 74 which is connected at its upper and lower regions by bolts 75 with the plate 52 and has at the center a circular opening which has two diametrically opposite recesses 76. The line connecting the two recesses 76 is at an angle of about 45° to the horizontal. The retaining plate 74 also has by the central opening two diametrically opposite recessed parts 77, the recesses facing the plate 42. The longitudinal centerline of the recesses is substantially horizontal and extends in the direction A. The retaining plate 74 serves as a quick-action connection for retaining a shear pin holder 78 having lugs 79 adapted to co-operate with the recessed parts 77. The holder 78 has a shear pin 80, which corresponds with the shear pin 40 of the first embodiment and comprises a number of portions 81 which can be broken off successively at grooves 82. The shear pin 80 is capable of breaking a great number of times, preferably about twelve times, after overload. The shear pin has an overall length of about 18 cms and a smallest diameter of about 19 mms. The shear pin 80 is acted upon by advancement means in the form of a compression spring 84 through a plunger 83 in the holder 78; this spring presses the pin 80 towards the portion 50A, the shear pin being preferably a close fit in the cutting plate 72. The end portion 81, when the shear pin is in a connecting position, engages the cutting plate 70. The spring 84 presses the shear pin 80 in a direction parallel to the axis 59.

The agricultural implement shown in FIGS. 5 to 10 operates as follows.

During operation the tines 50 are moved through the soil in the direction of the arrow A in FIG. 6 at a depth controlled by the lifting device 3. FIG. 5 shows that six tines are provided, and each is individually safeguarded against overload by a shear pin coupling. In order to obtain a compact arrangement inside the working width of the implement, one of the two outermost shear pin couplings is disposed as the mirror-image of the adjacent shear pin coupling, the shear pin coupling concerned then being located so that the two adjacent shear pins 80 are both located in the space between the two adjacent portions 50A. It should be noted that, in this embodiment, these two shear pin holders 78 may be replaced by a single holder in which only one compression spring is used for pushing both of the shear pins 80 towards the respective tines.

If, as in the preceding embodiment, a tine 50 with the tip 58 or a further operative portion passing through the soil encounters an excessive resistance, the portion 50A of the tine located between the plates 52 and 53 will exert a cutting force through the cutting plate 70 on the portion 81 of the shear pin 80 by the cutting plate 70. This force is applied in the direction opposite the arrow C in FIG. 10 so that the endmost portion 81 will break off the pin, and the rigid link between the tine 50 and the frame part formed by the beam 51 is disconnected so that the tine can turn in the direction of the arrow D in FIG. 7. During this turn the cutting plate 70 moves into a position such that the broken off portion 81 of the shear pin automatically drops out. The tine can deflect up to as far as a stop constituted by the sleeve 63, the actual distance depending upon the nature of the overload, so that the tine can, if necessary, pass with the tip 58 free of the soil. Owing to the advantageous disposition of the pivotal axis 59 directly above the tip 58, the upward deflection can be rapidly performed without any initial downward movement of the tip 58. The diagonal disposition of the shear pin 80 with respect to the axis 59 provides a maximum moment arm between the axis 59 and the pin 80 so that the pin 80 may have a comparatively light structure. The location of the pin 80 on the top of the tine means that the pin 80 can be checked and replaced easily.

After the cause of the overload has been eliminated or has been passed, the tractor driver actuates the lifting device 3 so that the tine 50 turns downwards again in the direction opposite the arrow D in FIG. 7. During the downward turn of the cultivator tine 50 the end of the remaining part of the shear pin 80 slides along the side face of the portion 50A until the portion 50A comes into contact with the set bolt 64. In this position, the shear pin 80 is pressed by the compression spring 84 into the space bounded by the cutting plate 70 and so takes up a new connecting position. The overload may happen again, but, under the action of the pin advancement means 84 the shear pin can each time be put into a new position. If the shear pin coupling comprising the portion 50A and the plate 52 has been in use for a long time, a certain amount of play may occur between the pin 80 and the cutting plate 70. This play can be eliminated by adjustment of the set bolt 64. Thus the set bolt 64 constitutes a means for compensating for wear of the shear pin coupling 66. After the shear pin is completely used up, the holder 78 can be removed very simply by turning it about its longitudinal axis through a small angle of about 45°. The holder can then be fitted with a new shear pin and be fixed back in place by means of the quick-action connection formed by the recessed parts 77 and the lugs 79. Thus the lugs constitute fixing means, while the recessed parts 77 together with the fixing plate 74 provide a quick-action connection for the holder.

In a third embodiment, shown in FIG. 11, an agricultural implement comprising a soil working machine 86 is attached by means of a trestle 87 to the lifting device 43 of a tractor 4. The machine 86 comprises at least two soil working member 88 and 89 which are adapted to reciprocate during operation and comprise ploughshares provided near their lower ends with plate elements 90. The machine 86 comprises a frame 91 supported at the front by a ground wheel 92. The frame 91 is provided with an eccentric mechanism 93, which is pivoted by means of arms 94 to stub shafts 95 arranged in arms 96. The arms 96 are connected by stub shafts 97 with the top ends of the members 88 and 89 respectively and by stub shafts 98 with the frame 91. Each arm 96 has a portion 99 which extends downwardly along the member 88 or 89 respectively and has near its end a shear pin holder 100, which is constructed like the holder 78 of the preceding embodiment. The shear pin 80 located in the holder 100 projects into a slot 101 in the member 88 or 89 respectively; this slot 101 is arcuate, centered on the axis of the stub shaft 97. The frame 91 is connected with the members 88 and 89 respectively by means of respective telescopic arms 102, which may have a considerable length when fully extended. Each arm 102 is connected by stub shafts 102 and 104 with the frame and the respective members 88 or 89.

The soil working machine shown in FIG. 11 operates as follows.

The eccentric mechanism 93 drives the members 88 and 89, with the plate elements 90, which tear up the soil. The working depth can be set by adjustment of the ground wheels 92. The reciprocatory movement caused by the eccentric mechanism is permitted due to the mounting of the soil working members 88 and 89 by a polygonal linkage formed by the stub shafts 97, 98, 103, 104 and the intermediate arms 96 and 102. During normal operation, the shear pin coupling comprising a first coupling member formed by the downwardly extending part 99 and a second coupling member formed by the soil working member 88 and 89 respectively allows movement of the arm 96 with respect to the member 88 or 89 respectively over the length of the slot 101. If an overload occurs, so that the member 88 or 89 respectively tends to turn about the stub shaft 97 in the direction indicated by the arrow E in FIG. 11, the end portion of the shear pin will be broken off by the end of the slot 101 so that the member forming the operative part of the machine can move rearwardly, with respect to the direction of travel A. This deflection is limited by the maximum extension of the telescopic arm 102. The member 88 or 89 respectively is provided with an ear 105 which supports the end of the shear pin 80 to hold the pin inside the holder 100. By raising the soil working members using the lifting device 3, the members pivot in a direction opposite the arrow E. Thus the end portion 81 of the shear pin 80 is pressed into the slot 101 so that the machine can resume normal operation. The shear pin coupling shown in FIG. 11 in use in a polygonal linkage provides reliable and practical overload protection, since, after fracture, the shear pin is moved automatically into a new connecting position. While various features of the implement and the coupling that have been described, and that are illustrated in the drawings, will be set forth in the following claims as inventive features, it is to be noted that the invention is not necessarily limited to these features and that it encompasses all of the features that have been described both individually and in various combinations.

What we claim is:

1. An implement comprising a frame and a working member rigidly connected to said frame during normal operation through coupling means, said coupling means comprising a first coupling member on said frame and a second coupling member on said working member, said first member being located coaxially within the second member and the two members being circular in cross-section with a common centerline, a shear pin within said first member and said pin extending outwardly into openings in the perimeters of said two members to prevent relative pivoting until overload, said pin being shearable upon overload and said second member being pivotable about said centerline, the opening of said second member being uncovered upon pivoting to allow a fractured end portion in the opening of the second member to be discharged.

2. An implement comprising a frame and at least one working member rigidly connected to said frame during normal operation through coupling means, said coupling means comprising a first coupling member on said frame and a second coupling member on said working member, said first coupling member being located coaxially within the second coupling member and a shear pin in a space defined by an interface formed between the two coupling members, said two coupling members being relatively pivotable at said interface and said shear pin interconnecting and normally preventing pivotable movement between said two members until overload shears said pin, said two coupling members being pivotable at least to a limited extent relative to one another about a common axis after fracture of said shear pin, advancement means positioned to displace the remainder of said pin to interconnect said two members, whereby said working member is again operative and rigidly connected to the frame, a major portion of the shear pin being positioned within the periphery of said first coupling member.

3. An implement as claimed in claim 2, in which the two coupling members are pivotable to a limited extent relative to one another about a common axis after fracture of said shear pin.

4. An implement as claimed in claim 2, in which the pivotal movement between said two members is limited by stop means which also limits the advancement of the shear pin.

5. An implement as claimed in claim 4, in which said two members are pivotable through about 90° in two directions from a central operative position.

6. An implement as claimed in claim 2, in which said interface has an aperture for lubricant between the two members.

7. An implement as claimed in claim 2, in which the shear pin comprises a plurality of shear pin portions separated by grooves.

8. An implement as claimed in claim 2, in which the working member is a reversible plow and said frame comprises a plow beam.

9. An agricultural implement as claimed in claim 8, in which at least two plow bodies are provided in overlying positions and connected with said plow beam by a single shear pin.

10. An implement as claimed in claim 2, in which said shear pin is located substantially entirely within a space bounded by said interface between said two coupling members.

11. An implement as claimed in claim 10, in which said working member comprises an elongated carrier that is connected with the frame by said shear pin, said sheer pin extending substantially parallel to the longitudinal axis of said carrier.

12. An implement as claimed in claim 11, in which said shear pin is housed in a holder that is releaseably connected with a part fixed rigidly to one of the coupling members, advancement means operatively associated with said shear pin, said advancement means comprising a compression spring within said holder.

13. An implement as claimed in claim 2, in which said first coupling member comprises a stub shaft.

14. An implement as claimed in claim 13, in which the centerline of said shear pin intersects the centerline of said stub shaft.

15. An implement as claimed in claim 14, in which said shear pin interfits with said second coupling member with play and means adjusting the amount of play between said pin and the second coupling member.

16. An implement as claimed in claim 15, in which a setting element bears on said second member and the position of said element is adjustable to vary the play.

* * * * *